United States Patent [19]

Ta et al.

[11] Patent Number: 5,198,904

[45] Date of Patent: Mar. 30, 1993

[54] AURAL CARRIER CORRECTION SYSTEM AND METHOD

[75] Inventors: Hong A. Ta, Montlignon, France; Raymond C. Kiesel, Lansdale, Pa.

[73] Assignee: Comark Communications, Inc., Colmar, Pa.

[21] Appl. No.: 660,556

[22] Filed: Feb. 25, 1991

[51] Int. Cl.$^5$ .......................... H04N 5/60; H04N 5/62
[52] U.S. Cl. .................................. 358/198; 358/197; 358/143
[58] Field of Search ............ 358/198, 197, 143, 191.1, 358/144–147, 186, 187; 381/94, 3–4, 13

[56] References Cited

U.S. PATENT DOCUMENTS

| | | |
|---|---|---|
| 3,135,827 | 6/1964 | Di Nardo . |
| 4,237,485 | 12/1980 | Saito et al. . |
| 4,322,746 | 3/1982 | Oguino .............................. 358/127 |
| 4,496,979 | 1/1985 | Yu et al. ............................. 358/197 |
| 4,518,997 | 5/1985 | Beckman ........................... 358/198 |
| 4,591,915 | 5/1986 | Davidov et al. ................... 358/198 |
| 4,602,288 | 6/1986 | Everett .............................. 358/197 |
| 4,623,921 | 11/1986 | Schmitz et al. .................... 358/198 |
| 4,716,464 | 12/1987 | Parker ............................... 358/197 |

FOREIGN PATENT DOCUMENTS

| | | |
|---|---|---|
| 3306562 | 2/1983 | Fed. Rep. of Germany . |
| 54-98119 | 2/1979 | Japan . |
| 55-53977 | 4/1980 | Japan . |
| 55-99887 | 7/1980 | Japan . |
| 59-51676 | 3/1984 | Japan . |
| 59-51677 | 3/1984 | Japan . |

OTHER PUBLICATIONS

"Intercarrier Buzz Phenomena Analysis and Cures", IEEE Transactions on Consumer Electronics, vol. CE-27, No. 3, Aug. 1981, Pieter Fockens & Carl G. Eilers.

"Aural/Visual Multiplex Operation of Klystron Type UHF Television Transmitters", The Pennsylvania State University Graduate School, Report in Engineering Science by Ronald W. Zborowski, Mar. 1981.

Primary Examiner—James J. Groody
Assistant Examiner—Glenton B. Burgess
Attorney, Agent, or Firm—Oblon, Spivak, McClelland, Maier & Neustadt

[57] ABSTRACT

A system and method reduce unwanted aural carrier modulation caused by the visual signal in a common amplification television transmitter which amplifies both an aural signal and the visual signal simultaneously. A non-linear amplitude domain video signal and a non-linear phase domain video signal respectively amplitude and phase modulate the aural signal to generate a modified aural signal. A non-linear amplifier is used to generate the non-linear amplitude domain video signal and the non-linear phase domain video signal which respectively having amplitude and phase components that are directly opposite to unwanted amplitude and phase components added to the aural signal by the visual signal.

20 Claims, 4 Drawing Sheets

AURAL CARRIER CORRECTION SYSTEM AND METHOD

BACKGROUND OF THE INVENTION

1. Field of the Invention

The present invention generally relates to common amplification television transmitters that amplify both aural and visual signals simultaneously, and more particularly, to a system and method for reducing residual modulation of the aural carrier typically caused in common amplification television transmitters.

2. Background Discussion

Aural carrier distortion is a systems problem which involves all of the elements of a television communication system, including the receiver as well as the transmitter. This unwanted distortion is caused by video components of the television signal modulating the visual carrier and because of the specific frequency bandwidth, those same video components affecting the aural signal in a different phase domain. This unwanted aural carrier modulation occurs in both the phase and amplitude domains and is related to the continuous modulation of the total signal envelope by the video signal components.

Specifically, the component of the video signal relating to the line scan frequency, which is found at 15.734 KhZ and harmonics thereof, is transferred as noise to the aural signal. Because the pilot frequency for stereo sound in the U.S. is set at 15.734 KHz, if the noise component added to the aural signal is sufficiently large, the receiver will erroneously perceive this noise as an indication that a stereo signal is being received. As a result, the Federal Communications Commission (F.C.C.) requires that the noise component at 15.734 KHz be 46 db below the reference level for the stereo pilot signal, i.e., the pilot frequency is protected.

Typically, such unwanted phase and amplitude modulation of the aural carrier is prevented, at the transmitter, by using separate picture modulation and sound transmitters, thereby avoiding the coprocessing of the visual and aural signals of the television signal. (See paper entitled "Intercarrier Buzz Phenomena Analysis and Cures" by Fockens et. al., IEEE Trans. on Consumer Electronics CE-27 (3) 381-394 (August 1981).) This separate transmitter arrangement, however, does not prevent unwanted aural carrier distortion and noise at the receiver. Patents directed to addressing correction of the aural carrier distortion at the television receiver include: U.S. Pat. Nos. 3,135,827, 4,237,485, 4,518,997, 4,602,288, and U.S. Pat. No. 4,716,464, as Well as JP 5498118, JP 55-53977, JP 55-99887, JP 59-51676 and JP 59-51677.

Common amplification television transmitter arrangements are known such as disclosed by DE 3306-562-A wherein the audio carrier is mixed with the amplitude modulated picture carrier so that both carriers then have the same phasing errors and these cancel in the intercarrier. However, this arrangement is directed to suppressing phasing errors in the picture carrier rather than addressing the problem of unwanted phase and amplitude modulation or noise in the aural carrier.

Moreover, aural carrier correction circuits currently in use do not independently correct the aural components; but rather, the entire commonly amplified signal is corrected without regard to phase differences that are present between the visual and aural carriers. These phase differences prohibit one correction signal from exactly canceling the unwanted products on both carriers simultaneously.

SUMMARY OF THE INVENTION

Therefore, one object of the present invention is to provide a system and method for reducing unwanted phase and amplitude modulation of the aural carrier of a common amplification television transmitter.

Another object of the present invention is to provide a system and method for reducing unwanted noise in the aural signal received from a common amplification television transmitter so as to comply with F.C.C. specifications for protection of the stereo pilot frequency.

A further object of the present invention is to provide a system and method for reducing unwanted phase and amplitude modulation of the aural carrier of a common amplification television transmitter which add phase and amplitude components that are directly opposite to those unwanted products caused by the common amplification technique in the following output stages of the transmitter.

Yet another object of the present invention is to provide a system and method for reducing unwanted noise appearing at any specific frequency in the aural signal received from a common amplification television transmitter.

One advantageous feature of the present invention is that the correction of the aural signal does not effect the linearity of the visual signal.

A further advantageous feature of the present invention is the ability to correct the aural carrier independently of the visual carrier.

The present invention provides for reducing unwanted noise in the aural signal independently of and in time with the video modulation. According to preferred embodiments of the system and method of the present invention, phase and amplitude components are added to the aural signal that are directly opposite to those unwanted products caused by the common amplification technique in the output stages of the transmitter. To accomplish this, phase and amplitude non-linear video signals are separately generated and phase and amplitude modulators are employed which are capable of effecting one parameter (phase or amplitude) without changing the other.

According to a preferred embodiment of the present invention these and other objects, advantages and features of the present invention are provided by an aural carrier correction system for a common amplification television transmitter which amplifies both an aural signal and a visual signal simultaneously. The system comprises a video delay circuit for receiving and delaying a video signal to provide a delayed video signal as well as a complimentary non-linear amplifier for receiving the delayed video signal and for independently and controllably generating a non-linear amplitude domain video signal and a nonlinear phase domain video signal. Also included is an amplitude and phase modulator for receiving the aural signal and for amplitude and phase modulating the aural signal using the non-linear amplitude domain video signal and the non-linear phase domain video signal, respectively, to generate a modified aural signal. An adder circuit is also included for adding the modified aural signal to the visual signal outputted by a IF vision modulator of the transmitter to reduce unwanted noise appearing at any specific frequency in the aural signal received from the transmitter.

DETAIL DESCRIPTION OF THE PREFERRED EMBODIMENT

Figure 1:
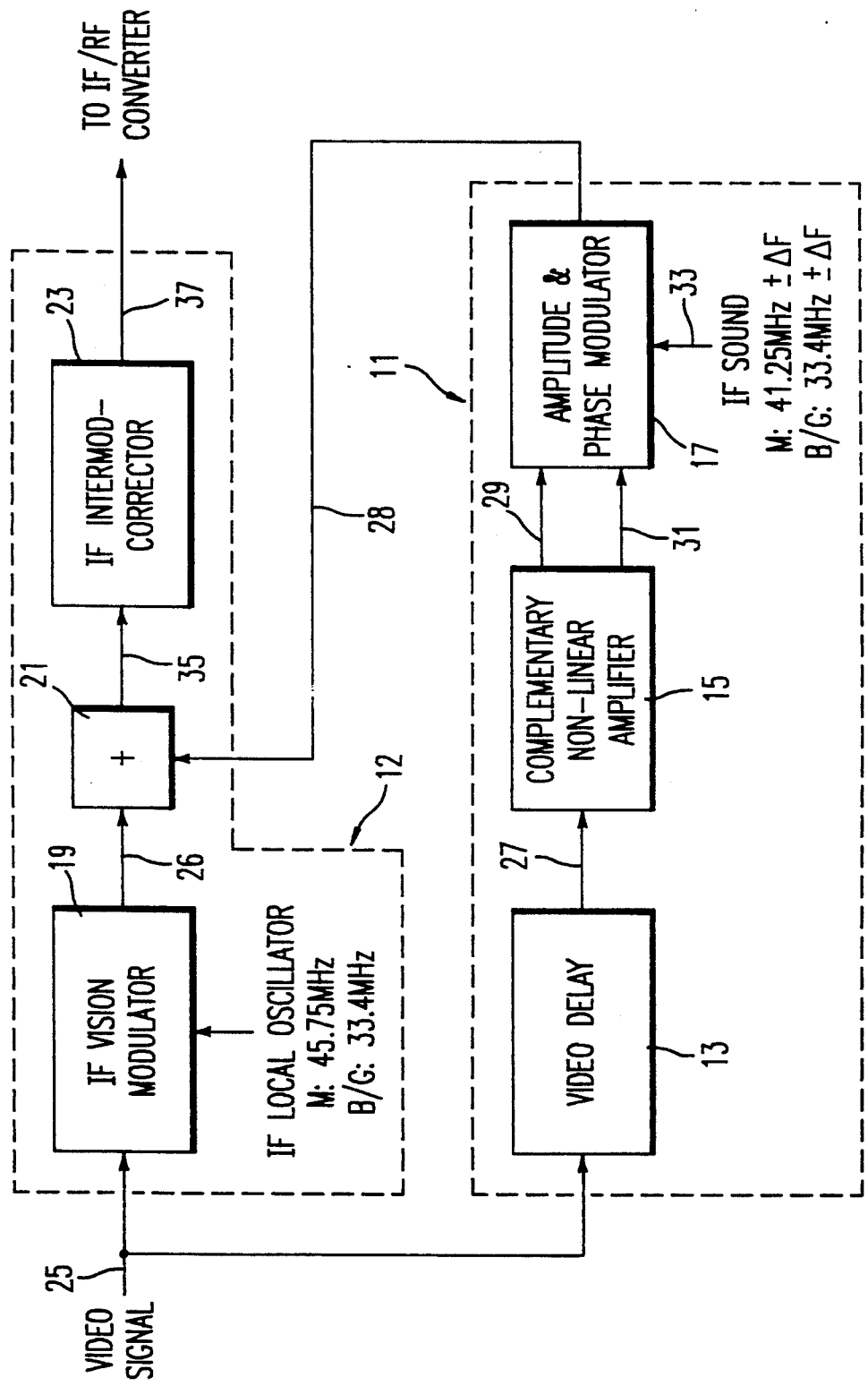
FIG. 1 is a block diagram illustrating the components of one embodiment of the system of the present invention.

FIG. 1 is a block diagram illustrating the various components of one embodiment of the aural carrier correction system, generally indicated at 11, and the connection of the system 11 to a known television transmitter, generally indicated at 12, of which only the IF vision modulator 19, adder 21 and IF intermodulation corrector 23 are shown for the sake of clarity. The system 11 includes a video delay circuit 13, a complimentary non-linear amplifier circuit 15 and an amplitude and phase modulator 17.

As shown in FIG. 1, a video signal 25 is inputted to both the IF vision modulator 19 of the transmitter 12 and the video delay circuit 13 of the correction system 11. Because the video signal 25 is delayed by the IF vision modulator 19, the video delay circuit 13 is included to provided a similar delay of the video signal 25 so that there is coincidence of the modified IF aural signal 28 with a visual signal 26, outputted by the IF vision modulator, at the adder 21.

An appropriately delayed video signal 27, outputted by the video delay 13, is inputted to the complimentary non-linear amplifier 15. The non-linear amplifier 15 is designed so that the inputted delayed video signal 27 can be selectively modified to produce two independently modified non-linear video signals as desired. In this regard, the non-linear amplifier 15 is constructed so that it can be appropriately configured by a technician to produce the two independent non-linear video signals with various clip points, amplitudes and selectable polarities for each segment thereof.

These non-linear video signals 29, 31, respectively for the amplitude and phase domains, are separately outputted by the non-linear amplifier 15 and independently inputted to the amplitude and phase modulator 17 which also receives an IF aural signal 33. The non-linear amplitude domain video signal 29 amplitude modulates the IF aural signal 33. The independently inputted non-linear phase domain video signal 31 then phase modulates the IF aural, to produce the modified IF aural signal 28 added to the visual signal at adder 21. A combined visual signal and modified aural signal 35 is provided to the IF intermodulation corrector 23, an output 37 of which is provided to an IF/RF converter (not shown).

Because the video signal is linear, but does not act on the aural carrier in a linear manner, the complimentary non-linear amplifier 15 is adjusted so as to separately modify the delayed video signal 27 to produce the separately generated non-linear video signals 29, 31 such that the unwanted noise components, in the amplitude and phase domains, are eliminated or at least reduced to acceptable levels at any specific frequency. This adjustment procedure is accomplished by spectral analysis of an uncorrected, commonly amplified television signal outputted by the transmitter 12 as will be more fully described with reference to FIG. 2.

Figure 2:
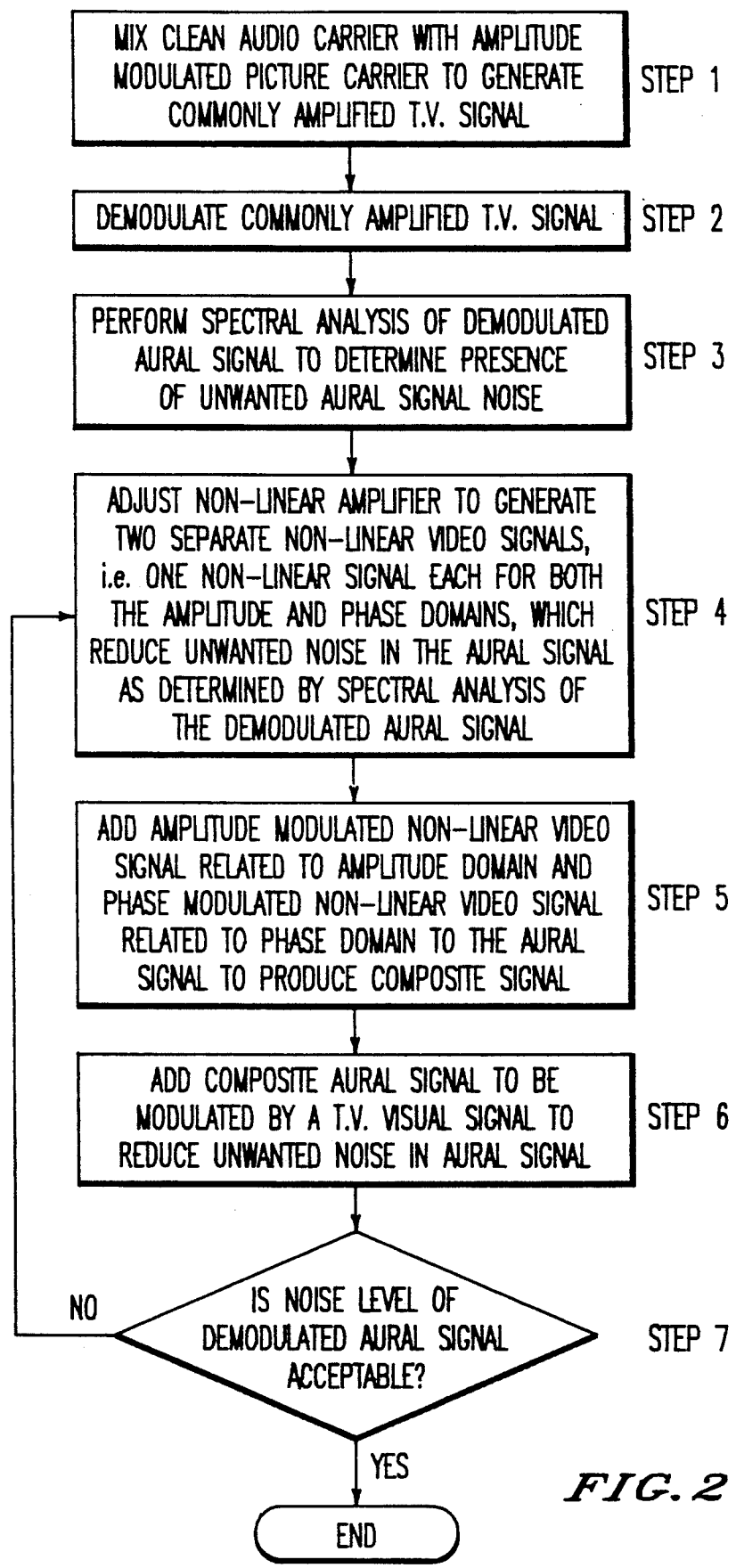
FIG. 2 is a flow chart illustrating one embodiment of the method of the present invention.

Referring the FIG. 2, in Step 1, a clean aural carrier signal, i.e., no sound, is mixed with an amplitude modulated picture carrier to generate a commonly amplified television reference signal. This reference signal is demodulated in Step 2 and a spectral analysis of the demodulated aural signal is performed in Step 3 to determine the presence and frequency of unwanted aural noise.

In Step 4, the non-linear amplifier 15 is adjusted to separately generate the non-linear amplitude domain video signal 29 and the non-linear phase domain video signal 31 which are employed to reduce unwanted noise in the aural signal. This adjustment procedure is basically performed by a trial and error adjustment of the non-linear amplifier 15, as will be more fully described hereinafter with particular reference to FIG. 3, so that the unwanted noise in the aural signal is reduced.

The separately generated non-linear amplitude domain video signal 29 and non-linear phase domain video signal 31 are inputted to the amplitude and phase modulator 17 along with the clean aural carrier to produce the modified IF aural signal 28 in Step 5 and added to the visual signal 26 at adder 21 in Step 6. The unwanted noise in the demodulated aural signal from the television transmitter 12 is then checked for noise in Step 7, i.e., a spectral analysis of the aural signal is performed as in Step 3, and the adjustment procedure, beginning with Step 4, is repeated if the noise level is unacceptable and if the noise level is acceptable, the adjustment procedure is terminated.

Figure 3:
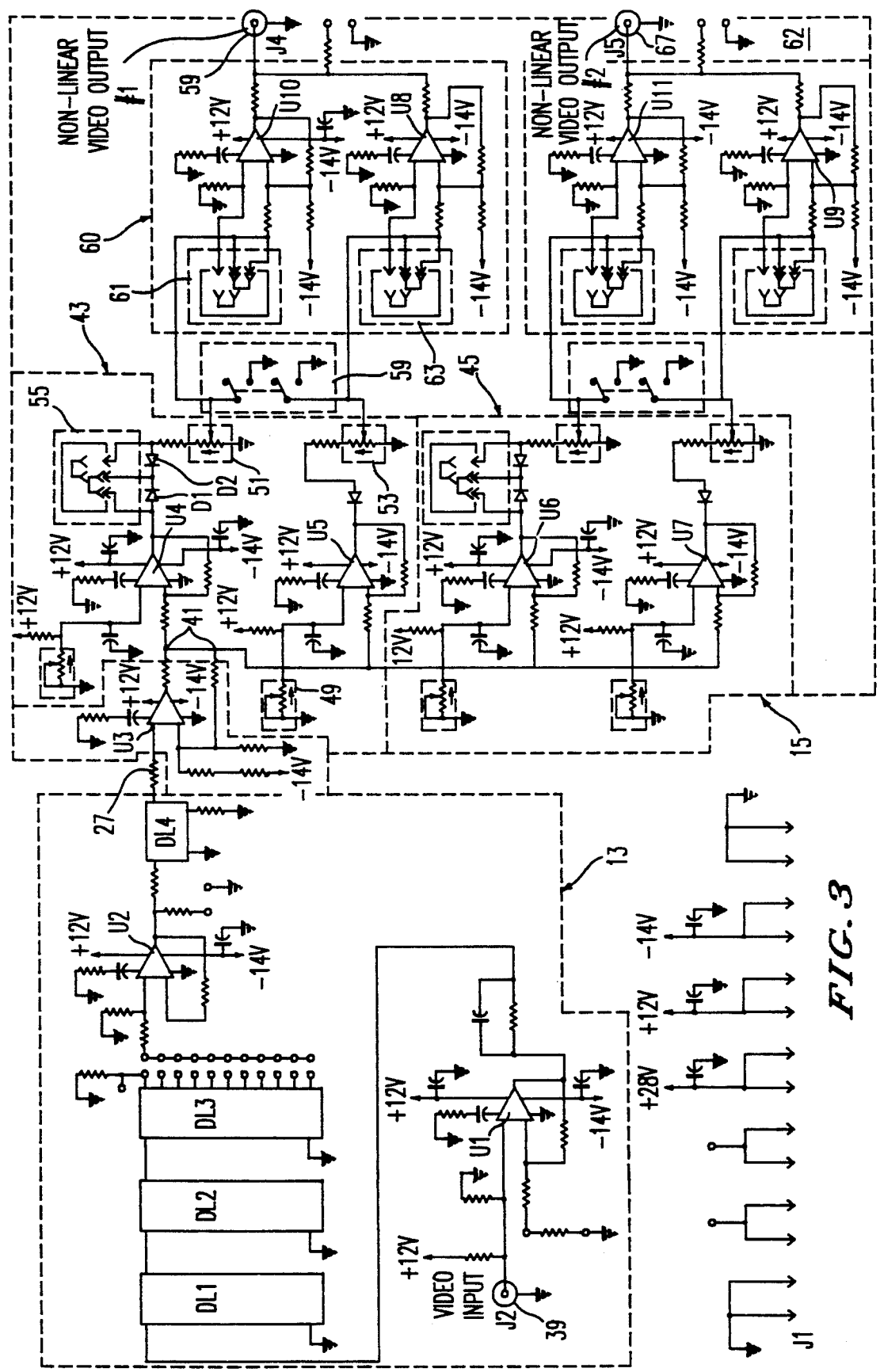
FIG. 3 is a circuit diagram illustrating one embodiment of the delay circuit and non-linear amplifier of FIG. 1.

Referring to FIG. 3, circuit diagrams are illustrated for both the delay circuit 13 and complementary non-linear amplifier 15. The video delay 13 is provided with a video input 39 for receiving the video signal 25 which is inputted to a series of delay lines DL1, DL2 and DL3 via op-amp U1, provided for amplification and isolation, the op-amp U1 having appropriate circuitry for supplying power and for setting the gain thereof as shown in FIG. 3. The output of delay DL3 is inputted to a further amplifier U2, also provided for amplification and isolation, which is connected to a video amp U3 of the non-linear amplifier 15 via a further delay line DL4. The video amp U3 has a settable gain and the output 41 thereof is provided to the inputs of first and second video manipulation circuits 43 and 45. Each of the video manipulation circuits 43 and 45 are identical and therefore only the elements of the first video manipulation circuit 4 will be described hereinafter.

Circuit 43 includes first and second amplifiers U4 and U5 each having an input potentiometer 47, 49 at one input thereof, respectively. The input potentiometers set a threshold input point, i.e., clip points, at which the respective amplifiers U4 and U5 see above or below the DC level set by these input potentiometers 47 and 49. It should be noted that each of the amplifiers U4 and U5 are non-linear and each have output potentiometers 51 and 53, respectively, which set the amplitude level at the output. U4 is provided with a jumper 55 which permits selective connection of diodes D1 and D2 between the output 56 of amplifier U4 and the output potentiometer 51. This arrangement permits the technician to selectively fold the video signal outputted by amplifier U4 back upon itself to further manipulate and modify the signal.

Each of the video manipulation circuits 43 and 45 are respectively connected to output circuits 60, and 62 which control the polarity of the non-linear video signal outputted thereby. In that each of the output circuits are identical in structure, only the structure and operation of output circuit 60 will be described below.

Outputs from amplifiers U4 and U5 of video manipulation circuit 43 are provided to inputs of both amplifiers U10 and U8 of output circuit 60 via a switch 59, each of the amplifiers U10 and U8 having input jumpers 61, 63 respectively connected to their inputs which permit further selective folding of the composite signal provided to each of these amplifiers U10 and U8. Outputs of amplifiers U10 and U8 are connected to a non-linear output terminal 65 which is connected, for example, to a non-linear video input of the amplitude and phase modulator 17 as will be described hereinafter. By operation of the jumper 61 and 62, the combined outputs of amplifiers U10 and U8 can change the direction of the non-linear video signal outputted thereby. Therefore, the output circuit 60, including amplifiers U10 and U8 determines whether the output signal is positive going or negative. In a similar manner, the signal outputted by the second video manipulation circuit 45 is inputted to a similar output circuit 62 which provides a modified non-linear video signal at output 67. This output is also connected to a non-linear video input of modulator 17.

Figure 4:
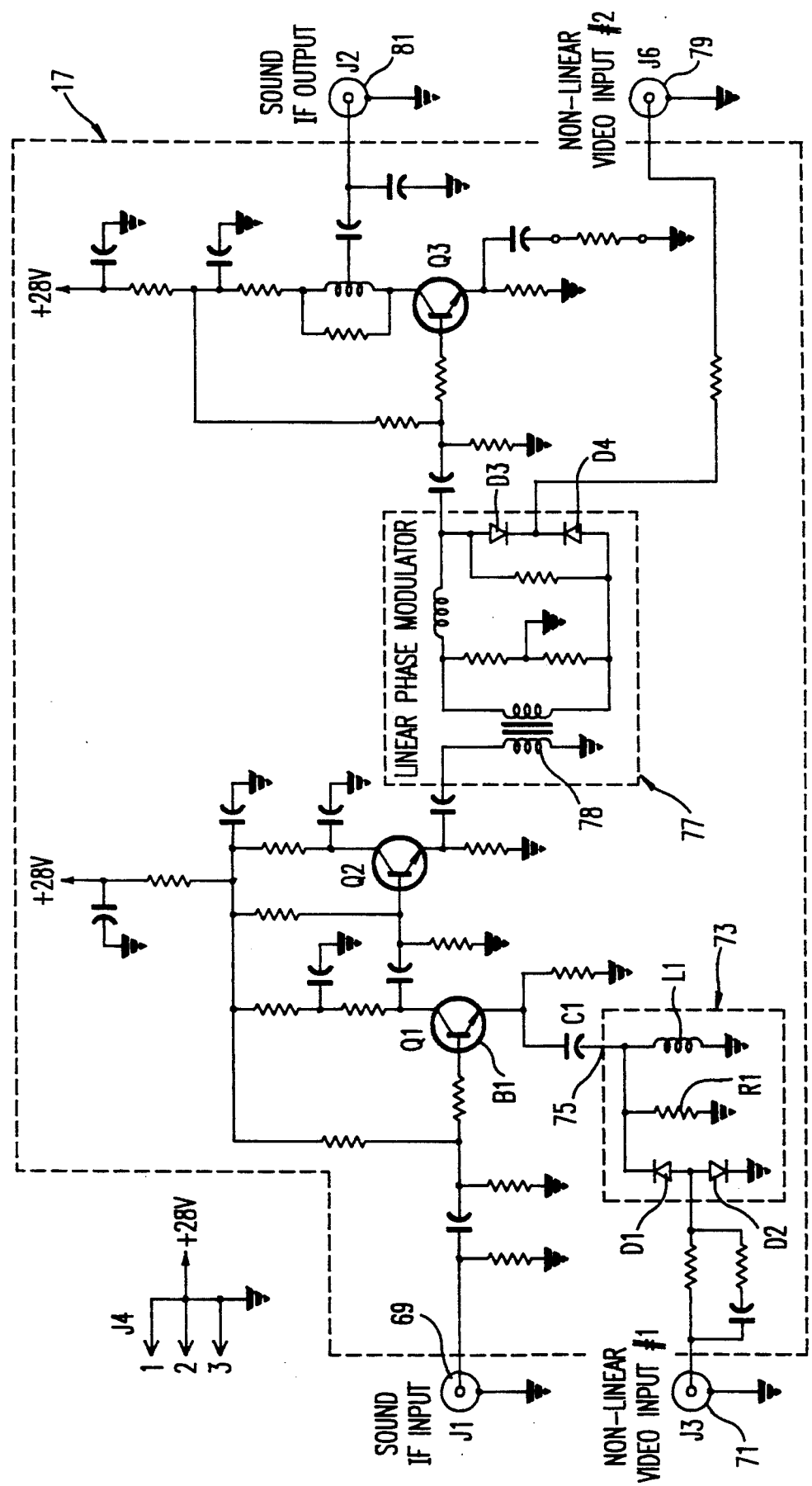
FIG. 4 is a circuit diagram illustrating one embodiment of the amplitude and phase modulator of FIG. 1.

Referring to FIG. 4, a circuit diagram of the amplitude and phase modulator 17 is illustrated. The modulator 17 includes a sound IF input 69 for receiving the IF aural signal 33 and a non-linear video input 71 for receiving the non-linear amplitude domain video signal 29 outputted, for example, by non-linear video output 65 of the non-linear amplifier 15. Video input 71 provides the amplitude domain video signal 29 to a amplitude modulator 73 which includes a pair of opposed diodes D1 and D2, resistor R1 connected to ground and inductor L1 also connected to ground. An output 75 of the amplitude modulator 73 is connected by a capacitor C1 to transistor Q1 having a base B1 connected to the sound IF input 69. Transistor Q1 and the associated amplitude modulator 73 provide amplitude modulation of the signal received via sound IF input 69 in direct proportion to the applied non-linear video signal inputted on non-linear video input 71. Transistors Q2 and Q3 provide amplification and isolation of the associated phase modulator circuit 77. This phase modulator circuit 77 preferably includes transformer 78, connected to transistor Q2 and a pair of opposed diodes D3 and D4 between which a further non-linear input 79 is connected. The modulator circuit 77 receives the non-linear phase domain video signal 31 via the non-linear video input 79 which is connected, for example, to non-linear video output 67 of the complementary non-linear amplifier 15. The phase modulator 77, which receives the output from transistor Q2, allows non-linear modulation of the signal received thereby in direct proportion to the applied non-linear video signal on input 79. The resulting modified aural IF signal 28 with the applied correction modulation is outputted via IF output 8 which provides the modified IF aural signal 28 to the adder 21 for further common amplification through the transmitter 12.

Thus, the aural carrier correction system and method of the present invention is used to reduce residual modulation of the aural carrier commonly caused in TV transmitters that amplify both the aural and visual signals simultaneously. This modulation occurs, as indicated above, in both the phase and amplitude domain and is related to the continuous modulation of the total signal envelope by the video components. The reduction of the unwanted phase and amplitude modulation in the aural carrier is, quite simply, effected by applying additional modulation to the aural carrier. This modulation also contains phase and amplitude components but is in direction opposition to the unwanted components. Since the unwanted components are by no means linear in nature, as described above, it is necessary to modify the applied video signal in a non-linear fashion and present it in equal but opposite form to the unwanted phase and amplitude modulation components.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by letters patent of the U.S. is:

1. An aural carrier correction system for a common amplification television transmitter which amplifies both an aural signal and a visual signal simultaneously, the transmitter including at least a IF vision modulator for receiving a video signal and for outputting the visual signal, the system comprising:
   a video delay circuit for receiving and delaying the video signal to provide a delayed video signal;
   a complimentary non-linear amplifier for receiving the delayed video signal and for separately and controllably generating a non-linear amplitude domain video signal and non-linear phase domain video signal; and
   an amplitude and phase modulator for receiving the aural signal and for amplitude and phase modulating the aural signal using the non-linear amplitude domain video signal and the non-linear phase domain video signal, respectively, to generate a modified aural signal; and
   an adder circuit for adding the modified aural signal to the visual signal outputted by the IF vision modulator to reduce unwanted noise appearing at specific frequencies in an output aural signal output from the transmitter.

2. An aural carrier correction system according to claim 1, wherein the video delay circuit provides a delay so that there is coincidence of the modified aural signal with the IF modulated signal at the adder circuit.

3. An aural carrier correction system according to claim 1, wherein the non-linear amplifier includes first and second video signal modifying means for independently generating the non-linear amplitude domain video signal and non-linear phase domain video signal, respectively, with various clip points, amplitudes and selectable polarities from the delayed video signal.

4. An aural carrier correction system according to claim 3, wherein the first video signal modifying means has an output for providing the non-linear amplitude domain video signal to an amplitude modulating input of the amplitude and phase modulator, and wherein the second video signal modifying means has an output for providing the non-linear phase domain video signal to a phase modulator input of the amplitude and phase modulator.

5. An aural carrier correction system according to claim 4, wherein the amplitude modulating input provides the non-linear amplitude domain video signal to an amplitude modulator of the amplitude and phase modulator for generating an amplitude modulated non-linear signal and wherein the phase modulating input provides the non-linear phase domain video signal to a phase modulator of the amplitude and phase modulator for generating a phase modulated non-linear signal.

6. An aural carrier correction system according to claim 5, wherein the amplitude and phase modulator includes an aural signal input for receiving the aural signal and means for combining the aural signal with amplitude and phase modulation signals to produce the modified aural signal.

7. An aural carrier correction system according to claim 6, wherein the aural signal received at the aural signal input is an IF aural signal.

8. An aural carrier correction system according to claim 3, wherein each of the first and second video signal modifying means includes first and second non-linear amplifier circuits respectively having receiving means for receiving the delayed video signal.

9. An aural carrier correction system according to claim 8, wherein each of the receiving means of the first and second non-linear amplifier circuits include input potentiometers for setting a clip point of the delayed video signal.

10. An aural carrier correction system according to claim 9, wherein each of the first and second non-linear amplifier circuits include outputs having output potentiometers for setting an amplitude level of a signal outputted thereby.

11. An aural carrier correction system according to claim 10, wherein one of the first and second non-linear amplifier circuits have a jumper for controllably connecting one of a pair of oppositely conducting diodes at the output thereof for selectively folding the delayed video signal back on itself.

12. An aural carrier correction system according to claim 11, wherein each of the first and second video signal modifying means are respectively connected, at an output thereof, to a signal inversion circuit for selectively changing a direction of a nonlinear video signal outputted thereby.

13. An aural carrier correction system according to claim 1, wherein the aural signal is an IF aural signal.

14. A method for reducing unwanted aural carrier modulation caused by a video signal in a common amplification television transmitter which amplifies both an aural signal and a visual signal simultaneously, the method comprising the steps of:

mixing an aural carrier with an amplitude modulated video signal to generate a commonly amplified television transmission signal;

demodulating the commonly amplified television transmission signal to provide a demodulated aural signal;

performing a spectral analysis of the demodulated aural signal to determine the presence and frequency of unwanted aural signal noise resulting from unwanted aural carrier modulation;

generating a non-linear amplitude domain video signal and a non-linear phase domain video signal which respectively having amplitude and phase components that are directly opposite to unwanted amplitude and phase components added to the aural signal by the video signal;

amplitude and phase modulating the aural signal using the non-linear amplitude domain video signal and the non-linear phase domain video signal, respectively, to generate a modified aural signal; and adding the modified aural signal to the visual signal in the transmitter.

15. A method according to claim 14, wherein the aural signal added to the amplitude modulated non-linear amplitude domain video signal and the phase modulated non-linear phase domain video signal is an IF aural signal.

16. A method according to claim 15, wherein the visual signal added to the modified aural signal is an IF visual signal.

17. A method according to claim 14, wherein the non-linear amplitude domain video signal and a non-linear phase domain video signal are generated separately.

18. A method according to claim 14, wherein the non-linear amplitude domain video signal and a non-linear phase domain video signal are respectively amplitude and phase modulated separately.

19. A method according to claim 14, wherein the amplitude modulated non-linear amplitude domain video signal and the phase modulated non-linear phase domain video signal are added to the aural signal separately.

20. A method according to claim 14, wherein the non-linear amplitude domain video signal and the non-linear phase domain video signal respectively have amplitude and phase components that are directly opposite to unwanted amplitude and phase components added to the aural signal by the video signal to eliminate noise in the aural signal at a predetermined frequency as determined by the spectral analysis.

* * * * *